Figure 1:
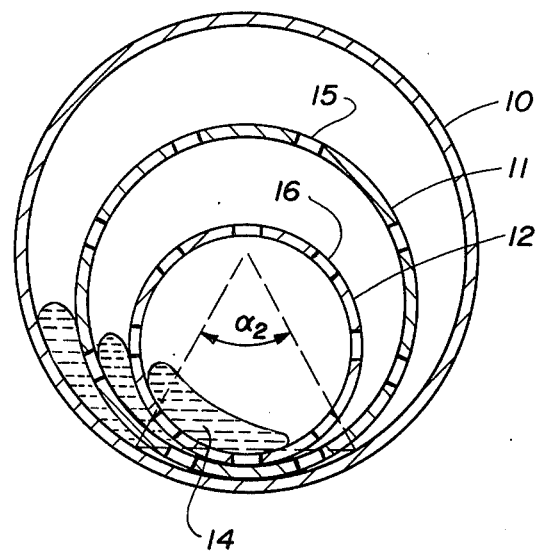

United States Patent [19]

Babinsky

[11] 4,003,557
[45] Jan. 18, 1977

[54] DEVICE FOR THE CEMENTATION OF METALS BY LIQUID AMALGAMS

[75] Inventor: Michal Babinsky, Ziar nad Hronom, Czechoslovakia

[73] Assignee: Zavod Slovenskeho narodneho povstania, narodny podnik, Ziar nad Hronom, Czechoslovakia

[22] Filed: Nov. 4, 1974

[21] Appl. No.: 520,618

Related U.S. Application Data

[63] Continuation-in-part of Ser. No. 223,521, Feb. 4, 1972, abandoned.

[52] U.S. Cl. .................. 266/169; 209/41; 209/62; 209/198; 266/101
[51] Int. Cl.² ........................ C22B 11/04
[58] Field of Search .......... 75/97 R, 97 A, 99, 100, 75/118; 266/12, 22, 101, 169; 23/269 R; 209/13–16, 41–43, 50, 52, 54–56, 59, 61, 62, 70, 174–177, 198, 200

[56] References Cited

UNITED STATES PATENTS

| 64,416 | 5/1867 | Hart | 209/198 |
|---|---|---|---|
| 660,774 | 10/1900 | Hicks | 209/198 |
| 694,203 | 2/1902 | Scott | 209/41 |
| 697,177 | 4/1902 | Scott | 209/41 |
| 773,266 | 10/1904 | Scott | 209/41 |
| 1,147,314 | 7/1915 | Dibert | 209/62 |
| 1,412,673 | 4/1922 | Burgess | 209/62 |
| 1,456,592 | 5/1923 | Haglund | 23/269 |

*Primary Examiner*—Roy Lake
*Assistant Examiner*—Paul A. Bell
*Attorney, Agent, or Firm*—Burgess Ryan and Wayne

[57] ABSTRACT

A cementation apparatus is provided wherein the reaction surface thereof can be increased without changing the outer dimensions. There is provided at least one inner cylinder which is freely mounted in an outer cylinder and placed one within the other. The inner cylinders are perforated along their outer surfaces and are preferably open at both ends as is the outer cylinder. In the cylinder assembly, all the cylinders as well as the cylinder assembly are rotated. A slurry containing material to be treated as well as the amalgam is fed into the cylinders and on rotating the cylinders, the slurry is picked up by the surface of each of the cylinders so as to provide a reaction area for cementation which is equal to the sum of the surface area of all the internal cylinders and inner surface area of the outer cylinder.

9 Claims, 7 Drawing Figures

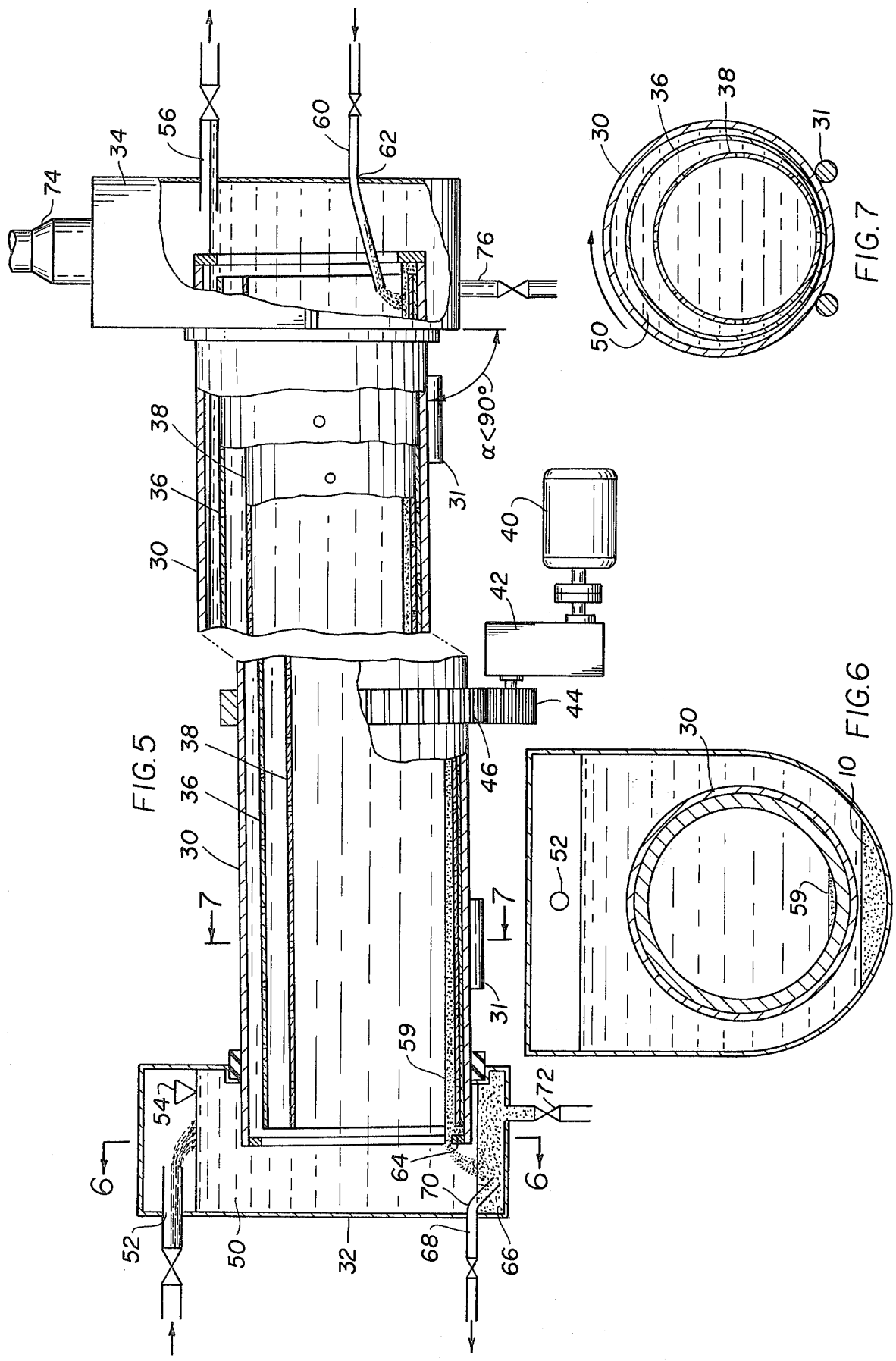

DEVICE FOR THE CEMENTATION OF METALS BY LIQUID AMALGAMS

This application is a continuation-in-part of application Ser. No. 223,521, filed Feb. 4, 1972 and now abandoned.

BACKGROUND OF THE INVENTION

The present invention relates to a device for metallurgical amalgamation, called cementation, whereby electropositive elements are reduced from their solutions by amalgams of less noble metals, mainly alkaline metals, and more particularly the present invention is directed to an improved cementation device, the reaction surface of which can be increased without changing the outer dimensions.

BRIEF REVIEW OF THE PRIOR ART

In the electrochemical terminology used herein, the expression "noble metals" comprises not only the expensive metals such as Au, Ag, Pt, etc., but also from the standpoint of electrochemical reduction, the noble metals referred to herein are those metals having a positive electrochemical potential in the group of standard potentials. In this respect, Cu is a nobler metal than, for instance, Cd, Ga, In, Tl, Sb and rare metals as La, Ce, Nd, Sm, Y. According to the present invention, an amalgam of a less noble metal is used as a cementation agent for the reduction of more noble metals. From the electrochemical point of view, the less noble metals are the more negative metals such as K, Na and Zn.

In the refining of gold, "cementation" in the classical meaning of the term refers to the process wherein a mixture of gold and other metals are heated with sodium chloride to convert silver and the base metals into chlorides. The gold is not affected so it can be separated from the chlorides.

An amalgam is an alloy of mercury and amalgamation refers to the method of forming amalgams. Cementation and amalgamation have been variously used in the reduction (removal of impurities) from gold, silver and other noble-type metals, either by alloying the gold or silver with mercury at room temperature and then heating the amalgam to remove the mercury, or by cementation of an impurity onto mercury or a mercury alloy, leaving a reduced gold, silver or other noble metal substance.

At the present time, this classical method is frequently applied to the recovery of Cd, Ga, Te, Sb, In, and of rare earths as La, Ce, Nd, Sm, Y. By the present method, it is possible to selectively reduce these metals with respect to their composition even if their concentration is very small compared with that of the carrier ore or with another raw material. A liquid amalgam of Na, K or Zn is mostly used as the reduction material for these elements.

Known devices designed for the cementation by liquid amalgams, i.e., where the alloy is in the liquid phase, may be divided in the following groups, according to their basic design arrangement:

a. Cementation devices of the mixer type, where the removal of the amalgam surface for a further reaction is carried out by mixing devices.

b. Cementation devices having the shape of horizontal tubs or troughs with unidirectional flow or counterflow of the cementation amalgam and of the cementation solution.

c. Cementation devices having the shape of vertical columns or towers into which the cementation amalgam is injected under pressure. The smaller the dispersed amalgam particles, the easier it is to increase the reaction surface, but simultaneously the loss of carrier medium also increases.

d. Cementation devices having the shape of horizontal rotating cylinders. The material of the cylinders is of such a kind as to cover itself with a continuous layer of amalgam able to undergo reactions. The efficiency of these cementation devices is increased by fitting them with segments, partitions, or the like. But means of this kind are able to increase the reaction only to a limited extent. Hence the cementation of trace elements, e.g., Ga, In, Ti, Cd, requires the use of cylinders of considerable size or a larger number of them which also greatly increases the size of the apparatus needed to carry out the cementation.

For instance, it is known to utilize a large outer cylinder in which a plurality of smaller solid cylinders are placed. These internal cylinders roll on each other and on the inner surface of the outer cylinder in a manner akin to a planetary gear assembly. To increase the surface area of the cylinders requires the use of more internal cylinders which means that the diameter of each of the internal cylinders must be decreased, or the size of the outer cylinders must be increased.

SUMMARY OF THE INVENTION

In accordance with this invention, it has been found that the surface area available for reaction can be increased tremendously without increasing the size of the outer cylinder or affecting the size of internal cylinders which are already in place in the outer cylinder.

Specifically the internal cylinders, in accordance with the instant invention are not only placed within the outer cylinder, but they are also placed one within the other. The inner cylinders are perforated along their outer surfaces and are preferably open at both ends, as is the outer cylinder. The cylinder assembly in accordance with this invention is rotated so that all cylinders rotate. A slurry containing the material to be treated and the amalgam is fed into the cylinders, the level of the slurry being sufficient to cover a portion of the surface of each of the cylinders. Upon rotation of the cylinders, the slurry is picked up by the surface of each of the cylinders, thereby providing a reaction area for cementation equal to the sum of the surface areas of all of the internal cylinders and the inner surface area of the outer cylinder. For best results, the outer cylinder is rotated to continually renew the reaction surface along all cylinders in the device.

Preferably, the inner cylinders freely rest one in the other, the outermost one of the inner cylinders resting on the inner surface of the outer cylinder in line contact therewith. The liquid slurry is preferably sufficient to cover to a level somewhat above the wall thickness of the innermost cylinder to assure that all cylinders, including the innermost one, are effective to provide surface area for the cementation reaction. The term "line contact" as used in this specification and claims means that a cylinder will rest on the next larger cylinder in the absence of liquid. The term is also defined to cover the situation in which liquid is present and forms a film between the two cylinders.

Thus, according to the present inventive concept, the noble metal is introduced in solution into a perforated rotating zone in the presence of an amalgam of an alkaline metal. The zone is rotated to cover the zone surface with the amalgam to cause cementation of the noble metal and the amalgam. The treated noble metal is then removed from the amalgam to recover a pure noble metal. Advantageously, the noble metal is selected from the group consisting of Cd, Ga, In, Tl, Sb, La, Ce, Nd, Sm and Y, and the amalgam can be Na, K or Zn in Hg.

The invention, as well as other objects and advantages thereof will become more apparent from the following detailed description when taken together with the accompanying drawings.

The cementation device that forms the object of the present invention provides a larger reaction zone than surface area than the devices of the prior art and consists in the arrangement of a plurality of horizontal rotating cylinders 11 and 12 inside an outer cylinder 10 through which passes the solution containing one of the noble metals Cd, In, Tl, Ga, etc., to be cemented and the amalgam of some alkaline metal, i.e., Na, K or Zn. The solution and amalgam are preferably pumped in at opposite ends of the cylinders. Both the solution and amalgam freely flow in counterflow on the basis of hydraulic descents which are created by appropriate closures similar to canal locks. Flow through the cylinders may also be provided by tilting the entire apparatus slightly or by the pressure of a pump. The cylinder walls become covered with a film of fresh amalgam which is highly reactive and able to reduce the noble metal from the passing solution. The size of these cylinders and their specific weight in relation to the quantity of amalgam contained in the outer cylinder should be carefully chosen. These cylinders remain immersed into the amalgam as indicated in FIG. 1. As is obvious from a consideration of the foregoing, the reactive surface can be varied simply by increasing the number of inner cylinders until one arrives at the required surface area. It is further apparent that the size of the outer cylinder need not be increased even if a large increase in surface area is desired.

The advantage of cementation devices according to the present invention resides in the possibility of intensively increasing the cementation effect by simply putting additional reaction cylinders into the basic cylinder without having to increase the external dimensions of the device. A 250 to 300 percent augmentation of the active surface is, for instance, obtained by the addition of one or two cylinders. One more advantageous feature is due to the fact that, with every revolution of the outer cylinder by 360°, all surfaces are renewed. This is particularly important for the reduction of metals in the presence of admixtures which provide insoluble reduction products, which settle themselves upon the amalgam surface so as to render it more passive.

Figure 2:
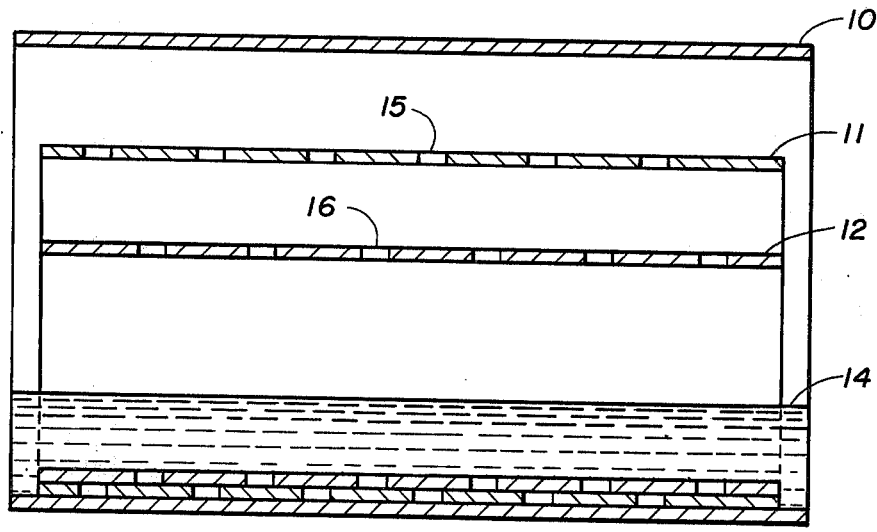
Figure 3:
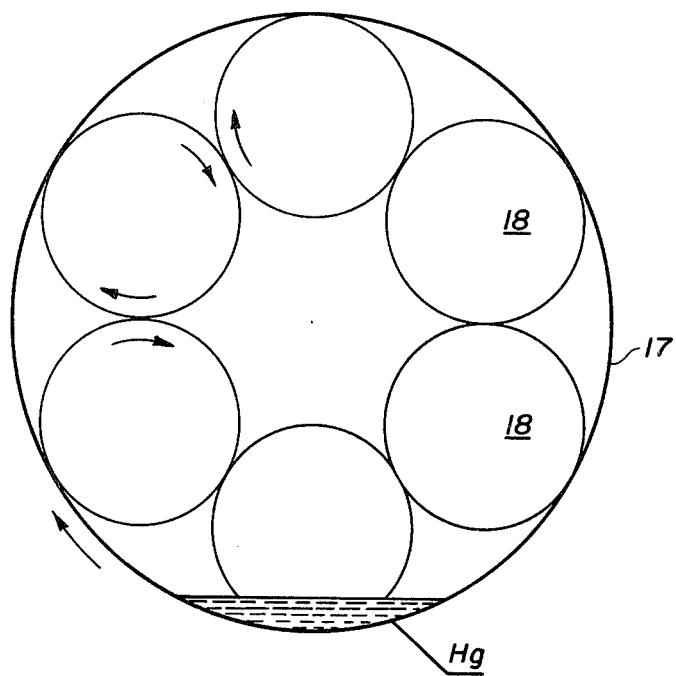
Figure 4:
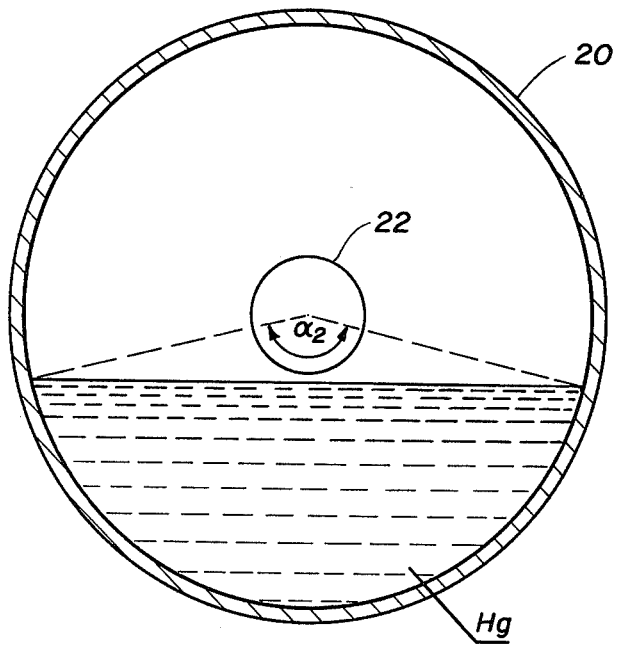

A cementation device according to the invention containing two perforated inner cylinders offset from the center is schematically indicated in the accompanying drawing where:

FIG. 1 shows a transverse section;
FIG. 2 depicts a longitudinal section through the cylinders;
FIG. 3 is plan view of a prior art apparatus;
FIG. 4 is plan view of still another prior art apparatus;
FIG. 5 is a plan view of still another embodiment of the apparatus;
FIG. 6 is a section view taken along line 6—6 in FIG. 5;
FIG. 7 is a section view taken along line 7—7 in FIG. 5.

Referring now to FIGS. 1 and 2 of the drawings which depict one preferred embodiment of the invention, the numeral 10 denotes an outer cylinder in which two inner cylinders 11 and 12 are placed. Inner cylinder 11 fits within the outer cylinder and rests on the bottom thereof. Inner cylinder 12 fits within inner cylinder 12 and rests on the bottom of inner cylinder 11. As can be readily appreciated from the drawings, line contact exists between cylinders 10 and 11 and between cylinders 11 and 12.

Inner cylinders 11 and 12 have a plurality of perforations 15 and 16 therein, respectively. All these cylinders, as shown, are open at their ends and the amalgam solution and solution containing the element to be removed may be pumped in by conventional pumping means. It is preferred to pump the amalgam in at one end and the solution containing the element to be removed at the other so that the two flow countercurrently. This feature is shown in FIG. 5 and will be more fully described below.

Conventional means (not shown) are provided for rotating the outer cylinder, such as an endless belt which passes around the outer cylinder and is driven by a conventional roller and motor drive assembly. Rotation of the outer cylinder will cause the inner cylinders to roll in the same direction as the direction of rotation of the outer cylinder. The liquid amalgam contained in the cylinders denoted by the numeral 14, will adhere to and coat the surfaces of the cylinder, thereby providing a continuous reaction surface which is the sum of the surface areas of the three cylinders 10, 11 and 12.

As shown in the drawings, the liquid need not fill the entire apparatus. It is sufficient if the liquid rises high enough to just cover a portion of the inner surface of the innermost cylinder 12. The rotation of the cylinders will continually pick up the liquid on the surfaces for reaction during rotation.

The perforations 15 and 16 permit a continous interchange of liquid between the inner cylinders, faster mixing and aid in providing a more even distribution of amalgam solution in the cylinders, thereby adding to the effectiveness of the apparatus.

The example given above relates to the three cylinder arrangement shown in the drawings. The following table illustrates the increased surface area available for reaction when using apparatus in accordance with the present invention.

TABLE I

| | | | | Relation of cylinder surface areas according to the parent Czechoslovak Patent Specification | | |
|---|---|---|---|---|---|---|
| Ex. No. | D /m/ | d /m/ | n /pcs/ | calculation | area /sq.m/ | enlargement /n-times/ |
| 1 | 1 | — | — | $\pi.D$ | 3.141 | — |
| 2 | 1 | 0.980 | 1 | $\pi.D + 2\pi.d_1$ | 9.23 | 3 times |
| 3 | 1 | 0.980 0.960 | 2 | $\pi.D + 2\pi/d_1+d_2/$ | 15.23 | 4.9 times |
| 4 | 1 | 0.980 | | | | |

TABLE I-continued

| Ex. No. | D /m/ | d /m/ | n /pcs/ | Relation of cylinder surface areas according to the parent Czechoslovak Patent Specification calculation | area /sq.m/ | enlargement /n-times/ |
|---|---|---|---|---|---|---|
| 5 | 1 | 0.960 0.940 0.980 to 0.500 | 3 25 | $\pi.D + 2\pi d_1+d_2+d_3/$ $F_o+n \cdot \frac{F_1+F_{25}}{2}$ | 21.23 120 | 6.7 times 38 times | where D = inner diameter of the outer cylinder in meters; $d$ = average diameter of each of the inner cylinders where more than one diameter is listed; $n$(pcs) is the number of cylinders in total the calculation column shows the calculation of available reactive surface area for the particular example; area = the calculated total area in square meters and enlargement is the increase in surface area of each example compared to the first in which the available area is one square meter.

One can readily appreciate that the surface area available for reaction can be greatly increased without expanding the size of the outer cylinder, or even disturbing cylinders already in place in the outer cylinder. In this connection, note that in each example, the inner cylinders are all the same size as in the preceding examples, only the additional cylinders being made somewhat smaller. One can have a device to which cylinders are simply added to increase surface area, it not being necessary to remove or change any sections of the apparatus.

Quite clearly, the apparatus according to the instant invention is not only compact, it is also extremely versatile and of great commercial utility. Little if any down time is needed to add or subtract cylinders, and a stock of pre-made cylinders can be kept on hand to vary the reactive surface at will.

As shown in FIG. 3, a prior art apparatus is shown in which an outer cylinder 17 surrounds a plurality of inner cylinders 18. The configuration shown is in the nature of a planetary gear set. The cylinders 18 will rotate in opposite directions to each other upon rotation of the outer cylinder, as shown by the arrows in the drawing. More importantly, surface area increase of the cylinders is limited unless one expands the diameter of the outer cylinders, which is not particularly desirable.

TABLE II

| Ex No. | D /m/ | d /m/ | n /pcs/ | Relation of the cylinder surface areas according to Fig. 3 calculation | area /sq.m/ | enlargement /n-times/ |
|---|---|---|---|---|---|---|
| 1 | 1 | — | — | $\pi.D$ | 3.141 | — |
| 2 | 1 | 0.500 | 2 | $\pi.D + 2n.\pi.d$ | 9.420 | 3 times |
| 3 | 1 | 0.414 | 4 | $\pi.D + 2n \cdot \frac{\pi \cdot D}{1+\sqrt{2}}$ | 13.551 | 4 times |
| 4 | 1 | 0.334 | 6 | $\pi.D + 2n.\pi.1/3\ D$ | 15.733 | 5 times |
| 5 | 1 | 0.0314 | 100 | $\pi.D + \frac{2\pi \cdot D}{d} \cdot \pi\ D$ | 22.880 | 7.28 times | where D = inner diameter of the outer cylinder; $d$ = outer diameter of each of the inner cylinders; $n$(pcs) is the number of inner cylinders; the calculation column gives the formula for calculating total surface area; the area column gives the total surface area for each example in square meters and the enlargement column gives the increase in surface area for each example as compared to the one square meter surface area of example 1.

A quick comparison of Tables I and II shows that the use of 100 inner cylinders in required to yield a surface area of 22.88m.² with the device of FIG. 3 whereas this is achieved with between 3 and 4 cylinders with the apparatus according to the present invention.

FIG. 4 depicts another type of prior art device consisting of an outer cylinder 20 having an inner disc system 22 (one only shown). A specific apparatus is described in Table III below.

TABLE III

| | |
|---|---|
| Overall diameter | — 1 meter; |
| length | — 1 meter; |
| discs | — 84 per one meter, thickness 2 mm, spacing along the axis: 10 mm, overall area about 120 sq.m. if the diameter of the inner cylinder is 100 mm; | calculation of the mercury/amalgam/consumption:

$V_o = 0.5^2 /\pi \frac{164.5°}{180} - \sin 164.5° = 325$ liters $V_d = 84 \times 2 \times 0.325 = 54.6$ liters $V_{Hg} = 325 - 54.6 = 270$ liters The specific mercury amalgam consumption in this example, $V_{Hg}$ is 30.3 kgs./square meter. In this and the following table, $V_o$ = volume of liquid based on an angle 22 as shown in FIG. 4 of 164.5°; Vd = volume of the individual discs; $V_{Hg}$ = volume of amalgam present at any one time in the apparatus.

Table IV below shows the consumption calculations for a device made in accordance with the present invention also having a reactive surface area of about 120 square meters.

TABLE IV

| | |
|---|---|
| diameter of the main cylinder | — 1 meter; |
| inner cylinders | — 25 cylinders/wall thickness 2 mm/having varying diameters of from 0.980 to 0.500 m / by 20 mm /; angle of the Hg sector: 60°; overall reaction surface area: about 120 sq.m. | calculation of the mercury consumption:

$V_o = \frac{0.5^2}{2} /\pi \frac{60}{180} - \sin 60°/ = 22$ liters

TABLE IV-continued $V_d = nq \frac{11 + 125}{2} = 10$ liters $V_{Hg} = 22 - 10 = 12$ liters The angle 22 herein is only 60° as seen in FIG. 1 and the specific mercury amalgam consumption $V_{Hg}$ is only 2.47 kgs./square meter. In addition, it has been found that when using gallium from aluminate solutions for cementation, the specific mercury amalgam consumption is even lower. As can be readily appreciated, the specific mercury consumption of cementation devices in accordance with the present invention is much lower for a given reactive surface area than that of the prior art represented by FIG. 4.

The apparatus of the instant invention is not only economical to build and use from the standpoint of increasing or decreasing reactive surface area at will, it is also extremely efficient in that much less mercury amalgam is needed to effect reaction as compared to other prior art devices.

FIGS. 5 – 7 show a second preferred embodiment of the invention. Outer cylinder 30 is rotatably journaled in end headers denoted by the numerals 32 and 34. Two additional cylinders 36 and 38 are mounted internally of cylinder 30 and are fully rotatable therein. Outer cylinder 30 is rotated via a motor 40 which is connected to a gear box 42. Gear box 42 has a shaft extending therefrom which shaft carries a conventional gear 44. A toothed ring 46 is fixedly mounted on outer cylinder 30 and engages gear 44 to rotate the outer cylinder 30. Bearings 31 are mounted along the length of the outer cylinder (two locations shown in FIG. 5) to support the rotating outer cylinder along its length.

As shown in FIG. 5, solution 50 is introduced through inlet part 52 in end header 32. The small triangle denoted by numeral 54 denotes the level or height of the solution in end header 32.

End header 34 is provided with an outlet part 56 for removing solution from the cylinders. The height of outlet part 56 is below the level of inlet part 52, thereby creating an hydraulic descent for the solution. Solution will always move from left to right in the cylinders as viewed in FIG. 5.

Sodium amalgam 59 solution, preferably with 0.2% to 0.5% by weight of a less noble metal than the metal to be removed from solution, is fed into the cylinders through pipe 60. Pipe 60 enters end header 34 through part 62 and extends inwardly into the cylinders substantially as shown in FIG. 5. The cylinders are angled downwardly from right to left at an angle of less than 90° to create an hydraulic descent for the amalgam. Amalgam that has reached the left side of the cylinders pours out over flange 64 into trough 66 contained in end header 32. Outlet 68 for the amalgam comprises a pipe 70 which is bent downwardly and immersed into the amalgam in the trough. The mercury in the amalgam, being heavier than the solution 50, displaces and prevents solution from being removed through pipe 70.

Pipes 60 and 68 form a closed loop circulation system for the amalgam (not shown) in which the amalgam is fed to an electrolyser for the replacement of sodium removed during the cementation process. After a sufficient concentration of noble metal is obtained in the amalgam, it is removed via valve 72. When using sodium or potassium as the less noble metal, hydrogen is generally formed and is then removed via pipe 74. When the solution 50 is no longer to be used, it is drained from the apparatus via valve 76.

As can be readily appreciated, the apparatus shown in FIG. 5 utilizes countercurrent flow of amalgam and solution. However, concurrent flow, i.e., flow in the same direction of both amalgam and solution may be used, if desired.

EXAMPLE

Equipment and Raw Materials

Size of outer cylinder: diameter 35 cm. length 695 cm.
Size of first inner cylinder: diameter 30 cm. length 690 cm.
Size of second inner cylinder: diameter 25 cm. length 690 cm.
Size of perforations in cylinders: 0.5 cm.
Material of construction of cylinders: steel
Number of perforations in inner cylinders: 25 per sq. cm.
Rotary speed of cylinders: 20 to 25 rpm
Noble metal: gallium
Solution: sodium aluminate liquor containing 0.10–0.40 gr. Ga per lit.
Amalgam: 0.2 to 0.4% Na in Hg.

Sodium aluminate liquor and sodium amalgam are continuously pumped along the cementation cylinders by conventional pumping means. The sodium used in the amalgam may be by electrolysis. The liquor is pumped to move at a speed of 0.5 m$^3$ per hour and the amalgam at a speed of 2 to 3 liters per minute. The film of fresh amalgam formed during the rotation reacts with the solution of sodium aluminate liquor. In the course of this electrochemical process, Ga as the nobler element is reduced to the metallic form and the sodium of the amalgam is dissolved, as negative element, in the solution. This exchange originates directly on the surface of the amalgam, therefore the metallic Ga is dissolved in the amalgam current. In the course of time, the concentration increases. Optimally, the process is conducted up to a 1% concentration of Ga in the amalgam (not shown). During the process, the sodium amalgam circulates, in a conventional closed cycle, over the cementator and a conventional electrolyzer. The electrolyzer is utilized to replace sodium, which normally decreases from the 0.3–0.4% level to about 0.1–0.2%. Electrolysis, in a closed loop system with the cementator, permits the amalgam to pick up additional sodium. The replenished amalgam is then recirculated to the cementator, the recirculation and replenishment process continuing until a sufficient amount of noble metal concentration has been obtained. After approximately reaching a 1% concentration of Ga in the amalgam, the latter is discharged for the purpose of extracting the Gallium. This extraction is carried out by means of sodium hydroxide in which Gallium is dissolved in the form of sodiumgallate containing Ga in a quantity of 50 to 100 gr. per liter.

It is intended to cover all modification of the preferred embodiment described hereinabove which fall within the spirit and scope of the invention as defined in the claims appended hereto.

I claim:

1. Cementation apparatus in which the improvement comprises an outer hollow cylinder, at least two inner cylinders freely mounted for rotation in said outer cylinder, said inner cylinders having decreasing diameters, each smaller diameter cylinder being placed within the next larger diameter cylinder and freely mounted for rotation therein, a solution of noble metal in the region between said inner and outer cylinders, and an amalgam of an alkaline metal in said region whereby rotation of said outer cylinder will rotate said inner cylinders to cause said amalgam and said solution to coat the walls of said inner and outer cylinders.

2. The cementation apparatus according to claim 1 in which each of the ends of each of the inner and outer cylinders is open.

3. Cementation apparatus comprising an outer cylinder, a plurality of perforated inner cylinders of decreasing diameter, each inner cylinder being positioned for free rotation inside the next larger diameter cylinder, a solution of a noble metal having impurities and an amalgam of an alkaline metal in said cylinders sufficient in volume to cover a portion of the inner surface of the smallest inner cylinder.

4. A cementation apparatus, comprising an outer rotatable cylinder, means for rotating said outer cylinder, a plurality of inner cylinders positioned in said outer cylinder for free rotation therein, said inner cylinders having decreasing diameters, with each smaller diameter cylinder being positioned within the next larger diameter cylinder and freely mounted for rotation therein, the ends of each of said inner and outer cylinders being substantially completely open, and means for flowing a solution of a noble metal and an amalgam of an alkaline metal in said cylinders with a depth at least sufficient to flow in the innermost of said inner cylinders.

5. The cementation apparatus of claim 4 wherein said means for flowing comprises means for flowing said solution and said amalgam in opposite directions in said cylinders.

6. The cementation apparatus of claim 5 wherein said cylinders are inclined to create a hydraulic descent for said amalgam.

7. The cementation apparatus of claim 4 wherein said cylinders are inclined to create a hydraulic descent for said amalgam in one direction in said cylinders, and further comprising fixed headers sealingly coupled to the ends of said outer cylinder for flowing said solution in the opposite direction in said cylinders.

8. The cementation apparatus of claim 4 further comprising fixed header means sealingly coupled to the ends of said outer cylinder for receiving said solution and amalgam flowing through said cylinders.

9. The cementation apparatus of claim 8 comprising means directing said solution into one of said headers and removing said solution from the other of said headers, means introducing said amalgam into the innermost of said inner cylinders, and means withdrawing amalgam from one of said headers.

* * * * *

UNITED STATES PATENT OFFICE
CERTIFICATE OF CORRECTION

Patent No. 4,003,557　　　　　　　　Dated January 18, 1977

Inventor(s) Michal Babinsky

It is certified that error appears in the above-identified patent and that said Letters Patent are hereby corrected as shown below:

Column 4, Table I: Delete "to the parent Czechoslovak Patent Specification".

Column 4, Table I, Ex. No. 4 should read:

| Ex. No. | D /m/ | d /m/ | n /pcs/ | calculation | area /sq.m/ | enlargement /n-times/ |
|---|---|---|---|---|---|---|
| 4 | 1 | 0.980 | | | | |
| | | 0.960 | | | | |
| | | 0.940 | 3 | $\pi \cdot D + 2\pi/d_1 + d_2 + d_3/$ | 21.23 | 6.7 times |

UNITED STATES PATENT OFFICE
CERTIFICATE OF CORRECTION

Patent No. 4,003,557      Dated January 18, 1977

Inventor(s) Michal Babinsky

It is certified that error appears in the above-identified patent and that said Letters Patent are hereby corrected as shown below:

Column 6, line 37: Change "22" to -- $\alpha 2$ --.

Column 7, Table IV: Change "nq $\frac{11 + 125}{2}$ = 10 liters" to

-- nq $\frac{\ell_1 + \ell_{25}}{2}$ = 10 liters --.

Column 7, line 7: Change "angle 22" to --angle $\alpha 2$ --.

Signed and Sealed this

*thirtieth* Day of *August 1977*

[SEAL]

Attest:

RUTH C. MASON
*Attesting Officer*

C. MARSHALL DANN
*Commissioner of Patents and Trademarks*